United States Patent [19]

Yamada et al.

[11] Patent Number: 5,430,711
[45] Date of Patent: Jul. 4, 1995

[54] GROUP MODULATOR

[75] Inventors: Yoshifumi Yamada, Kanagawa; Tadashi Shibato, Tokyo, both of Japan

[73] Assignee: Nippon Telegraph & Telephone Corporation, Tokyo, Japan

[21] Appl. No.: 201,989

[22] Filed: Feb. 25, 1994

[30] Foreign Application Priority Data

Feb. 26, 1993 [JP] Japan .................. 5-037910

[51] Int. Cl.$^6$ ............................................ H04J 11/00
[52] U.S. Cl. ...................... 370/20; 375/261; 375/269
[58] Field of Search ............ 370/20, 18, 19, 7, 8, 370/9, 10, 77, 69.1, 70, 50; 375/1, 39, 57, 43, 50, 77, 80, 81, 102, 61, 45, 46, 42; 455/303, 60, 23, 37.1, 65, 52.1

[56] References Cited

U.S. PATENT DOCUMENTS 4,780,884 10/1988 Karabinis ............ 370/20
5,237,586 8/1993 Bottomley ............ 370/20

FOREIGN PATENT DOCUMENTS 3-35640 2/1991 Japan .

OTHER PUBLICATIONS

"A FH Modulator with Sampling Period Conversion Technique", Yamada et al., Proceedings of the 1992 IEICE Spring Conference, Mar. 24–27, 1992, pp. 2–359.

Primary Examiner—Douglas W. Olms
Assistant Examiner—Dang Ton
Attorney, Agent, or Firm—Nikaido, Marmelstein, Murray & Oram

[57] ABSTRACT

A group modulator provided a plurality of digitally modulated signals with frequency division multiplex, having a time division multiplexer (11) for multiplexing a plurality of input data (#1 through #n). A mapping circuit (12) provides an I-channel signal and a Q-channel signal according to a pattern of the multiplexed signal and the modulation system. A pulse shaping circuit (13) restricts bandwidth of the I-channel signal and the Q-channel signal. A frequency shift circuit (14) shifts frequency of the I-channel signal and the Q-channel signal by the frequency defined by the carrier control signal (i) for each input data. An accumulator (21,22) accumulates each of the I-channel signal and the Q-channel signal of the output of the frequency shift circuit (14) during a predetermined period (T). A D/A converter (31, 32) converts the output of the accumulator from digital form to analog form. A low pass filter (41, 42) is provided at the output of the D/A converter. A quadrature modulator (5) modulates carrier frequency ($f_c$) with quadrature modulation according to the I-channel signal and the Q-channel signal at the output of the low pass filter. A multiplicity control (6) controls multiplicity in the time division multiplexer (11) according to an external multiplicity signal.

9 Claims, 8 Drawing Sheets

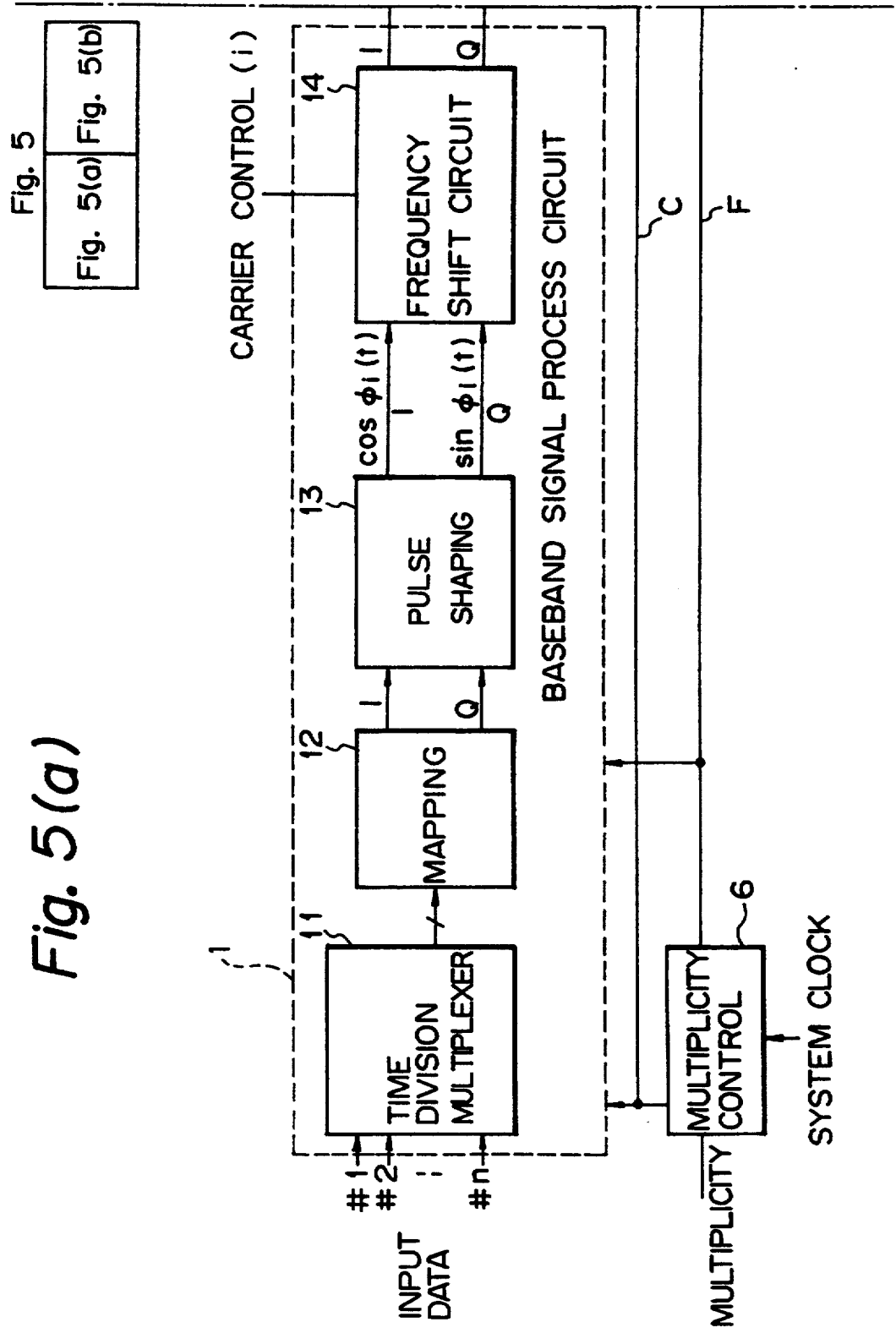

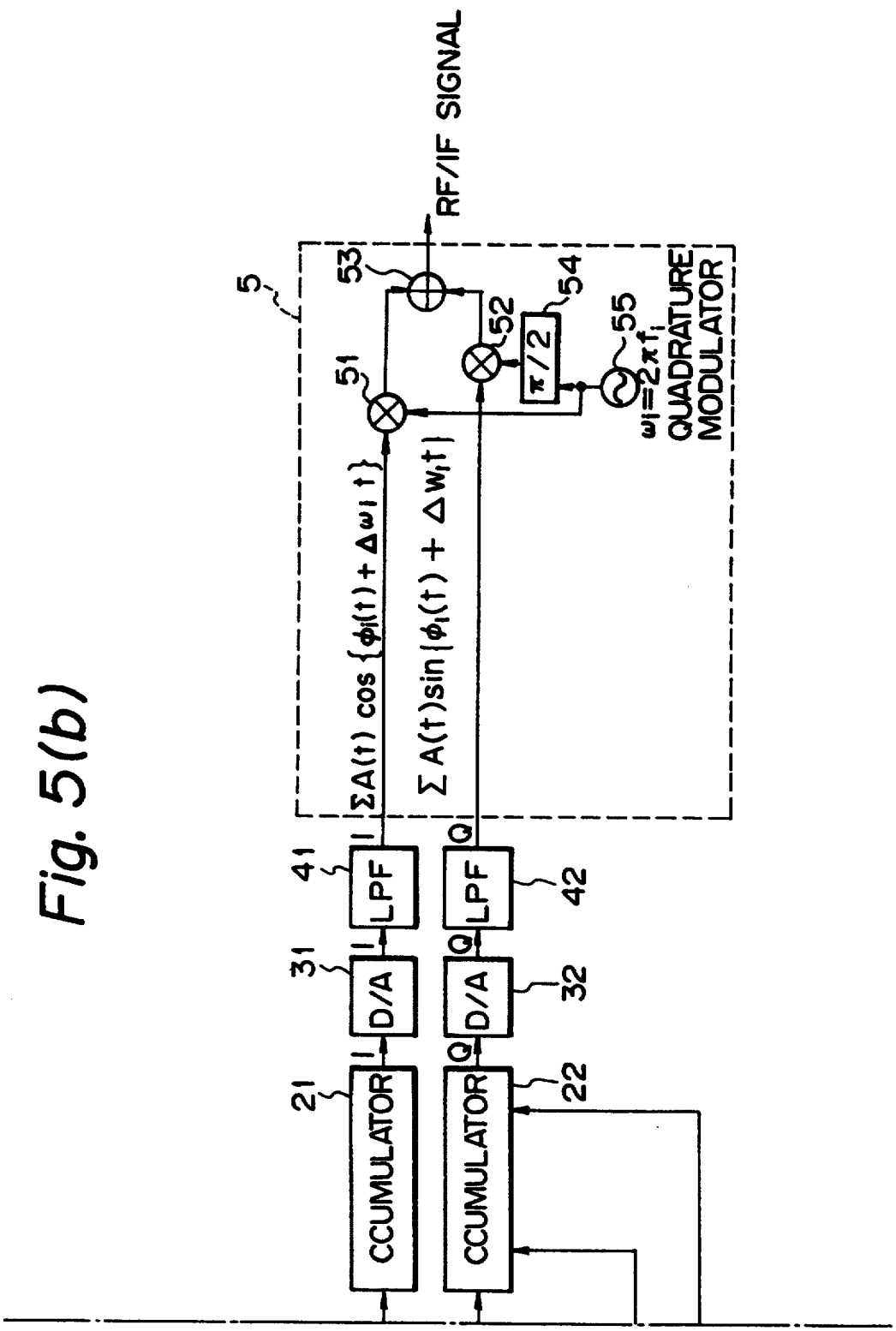

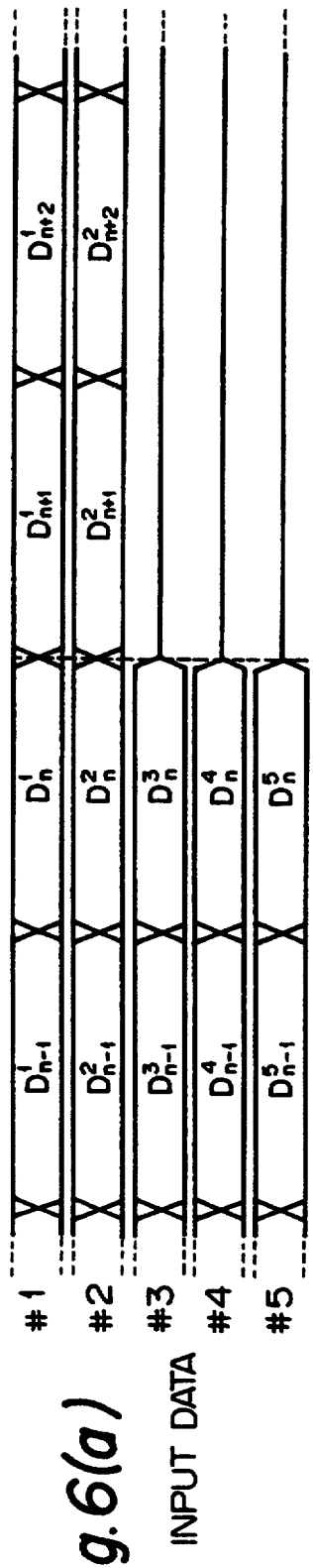
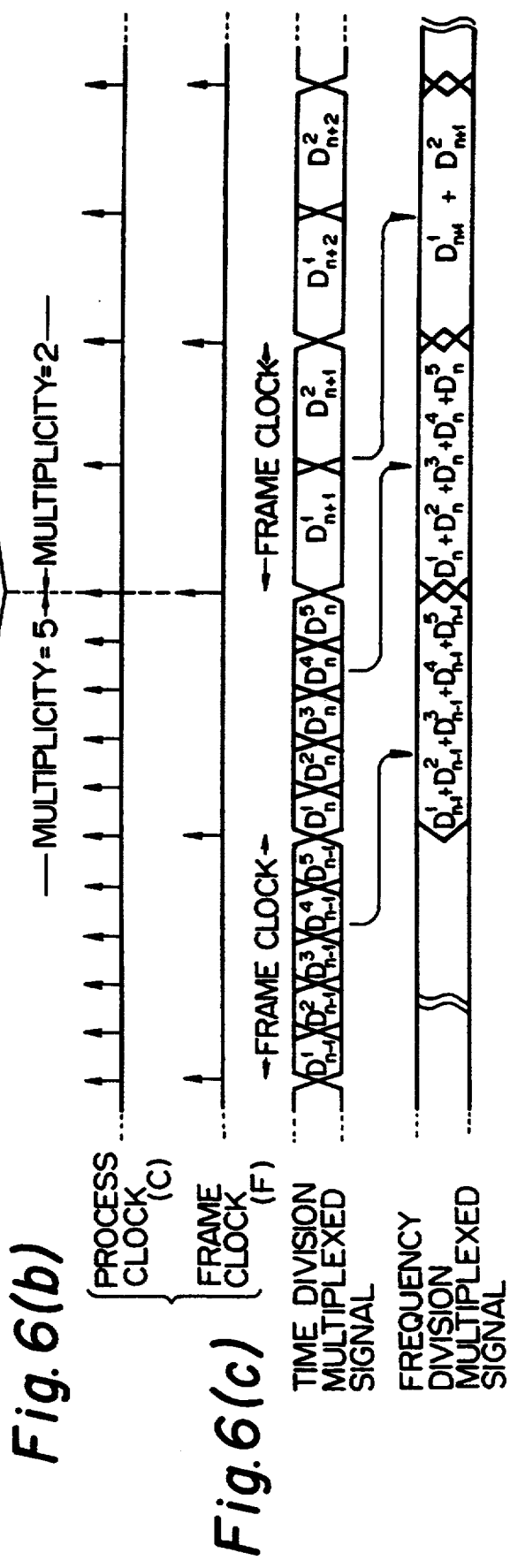

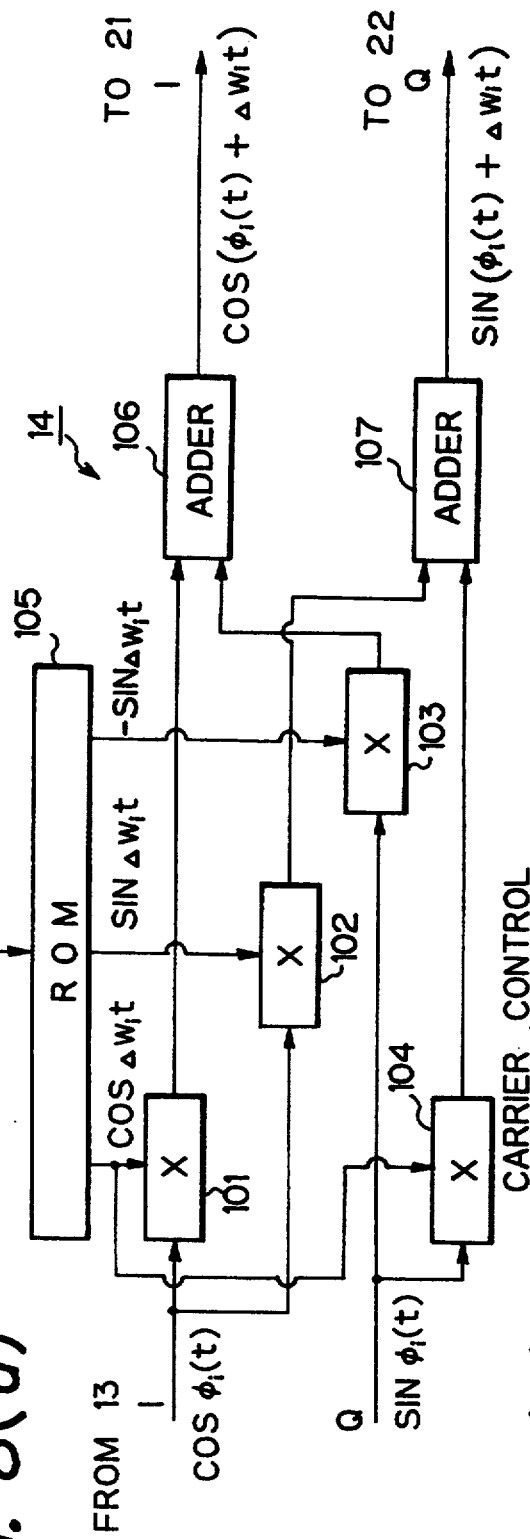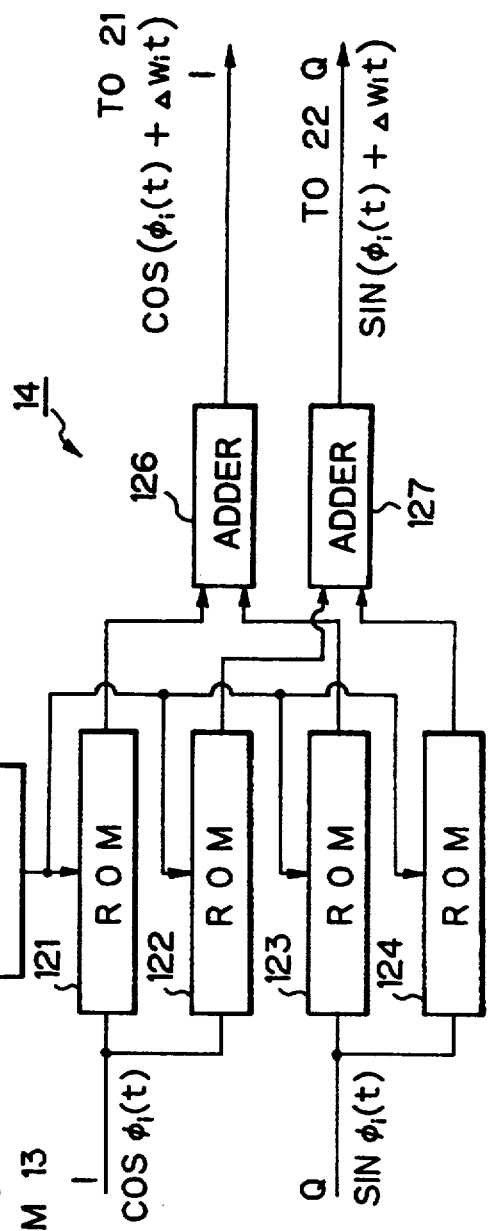

GROUP MODULATOR

BACKGROUND OF THE INVENTION

The present invention relates a group modulator, which is used in a digital radio communication system, for providing a plurality of modulated signals based upon a plurality of input data.

In a mobile communication system, a cellular communication system, and/or a personal communication system, a base station must transmit a plurality of radio signals simultaneously. The number of radio signals in each base station is lately increasing because of increase of traffic.

FIG. 1 shows a spectrum of modulated radio signals which are transmitted simultaneously, where f1 through f5 are center frequency of each radio signal. The solid lines f1, f3 and f4 show radio signal which is actually modulated, and the dotted lines f2 and f5 show the status that the modulated signals are not output.

A digitally modulated signal which has a carrier signal modulated with base band data signal in digital form is produced by using a quadrature modurator which receives in-phase component (I-channel signal) and quadrature component (Q-channel signal).

FIG. 2 shows a block diagram of a prior modulator which provides a plurality of radio signals. In the figure, the numerals 100, 101 and 102 show a modulator which modulates a single input data, and 103 is an adder for adding the outputs of all the modulators. The output of the adder 103 is high frequency signal. As the structure of the modulators 100 through 102 is the same as one another, the modulator 100 is described in detail. The modulator 100 has a mapping circuit 112 which receives an input data #1, and provides I-channel signal and Q-channel signal for quadrature modulation according to instantaneous pattern of input data, and modulation system. Those I-channel signal and Q-channel signal are applied to the pulse shaping circuit 113 which restricts bandwidth of those signal. The I-channel signal and the Q-channel signal of the output of the pulse shaping circuit 113 are then applied to the digital-to-analog converters 131 and 132, respectively for the conversion of the signal from digital form to analog form. The outputs of the converters are applied to the mixers 151 and 152 which are a part of the quadrature modulator, through the low pass filters 141 and 142, respectively. The oscillator 155 provides the carrier frequency f1 which is designated by an external carrier designation signal #1. The carrier frequency f1 of the oscillator 155 is applied to the mixer or the multiplier 151 and the other mixer or the multiplier 152 through the 1/2 phase shifter 154. The outputs of the mixers 151 and 152 are added in the adder 153, which provides the quadrature modulated signal which has the carrier frequency f1 modulated with the input data #1. Similarly, the modulators 101 and 102 provide the quadrature modulated signals having the carrier frequencies f2 and f3, respectively, modulated with input data #2 and #3, respectively. The combination of the mixers 151 and 152, the adder 153, the oscillator 155 and the phase shifter 154 is a conventional quadrature modulator. Those modulated signals are added in the adder 103, to provide high frequency radio signal.

It should be noted in FIG. 2 that each input signal is modulated in each modulator, in other words, a plurality of modulators equal to the number of input data are essential.

Therefore, the prior art of FIG. 2 has the disadvantages that the structure of the apparatus is complicated as a plurality of modulators are essential, and that the amount of the traffic to be handled is limited by a number of modulators installed, in other words, it is impossible to follow adaptively the change of amount of traffic of input data.

In order to solve those disadvantages, we first considered the group modulator shown in FIG. 4, which was considered in our research laboratory, but is not commercially used. That is now explained.

The frequency $f_i$ is considered that the reference carrier frequency $f_c (=w_c/2\pi$; $w_c$ is angular frequency, $\pi$ is pi$=90°$) shifts by $\Delta f_i (=\Delta w_i/2\pi)$, as shown in FIG. 3.

Digitally modulated signal S(t) is expressed as follows.

$$S(t) = A(t) \cos(\Theta_i(t) + (w_c \Delta w_i)t) \quad (1)$$

where A(t) is instantaneous value of base band signal in signal space diagram, and $\Theta_i(t)$ is instantaneous phase angle.

The equation (1) is transformed as follows.

$$S(t) = A(t) \cos(\Theta_i(t) + \Delta w_i t)\cos w_c t - A(t) \sin(\Theta_i(t) + \Delta w_i t)\sin w_c t \quad (2)$$

Therefore, it should be noted that a modulated signal having the carrier angular frequency ($w_c + \Delta w_i$) may be produced by (1) frequency-shifting a base band signal $\Theta_i$ (I-channel signal and Q-channel signal, respectively) by $\Delta w_i$, and (2) effecting quadrature modulation for angular carrier frequency $w_c$ with the frequency shifted signals. The resulated modulated signal is the same as the quadrature modulated signal of angular carrier frequency ($w_c + \Delta w_i$) with the non-shifted base band signal $\Theta_i(t)$.

A plurality of modulated signals having a plurality of carriers are expressed as follows.

$$S(t) = \Sigma A(t) \cos(\Theta_i(t) + \Delta w_i t)\cos w_c t - \Sigma A(t) \sin(\Theta_i(t) + \Delta w_i t)\sin w_c t \quad (3)$$

Therefore, it should be noted that a plurality of modulated signals are obtained by the steps of (1) frequency-shifting I-channel signal and Q-channel signal of each base band signal $\Theta_i$ by the frequency $\Delta w_i (=2\pi f_i)$ which is defined by the externally supplied carrier control signal, (2) adding all the I-channel signals (and all the Q-channel signals), and (3) effecting quadrature modulation for angular frequency $w_c$ with the sum of the I-channel signals and the sum of the Q-channel signals.

FIG. 4 shows a block diagram of the prior group modulator implementing above consideration. In the figure, the symbols 61, 62, and 6n are a base band signal process circuit each of which receives an input data #1, #2, and #n, respectively. Each base band signal process circuit functions to serial-parallel conversion of an input data, mapping of signals allocating amplitude and phase of I-channel signal and Q-channel signal according to the pattern of the input data and the modulation system, to restrict bandwidth of the signals according to the transmission system, and to provide the frequency-shifted I-channel signal and Q-channel signal according to the externally supplied carrier control signal. The full adder 71 adds the I-channel signals of all the input data #1 through #n to provide the frequency-division multiplexed I-channel signal. Similarly, the full adder 72 adds the Q-channel signals of all the input data #1 through #n to provide the frequency-division multiplexed Q-channel signal.

The I-channel signal multiplexed by the full adder 71 is converted to analog form by the digital-to-analog (D/A) converter 31, the output of which is applied to the quadrature modulator 5 through the low pass filter 41, which restricts the bandwidth of the I-channel signal. Similarly, the Q-channel data multiplexed by the full adder 72 is converted to analog form by the D/A converter 32, the output of which is applied, through the low pass filter 42, to the quadrature modulator 5.

In the quadrature modulator 5, the multiplier 51 provides the product of the output of the low pass filter 41 and the carrier frequency $f_c$ which is supplied by the oscillator 55, and the multiplier 52 provides the product of the output of the low pass filter 42 and the carrier frequency $f_c$ with the phase shift by $\mathsf{T}/2$ supplied by the oscillator 55 through the phase shifter 54. The adder 53 adds the outputs of the multipliers 51 and 52 to provide radio frequency signal RF, or intermediate frequency signal IF.

However, the prior apparatus of FIG. 4 has the disadvantage that a plurality of base band signal process circuits 61 through 6n must be essential, since each input data is separately processed to provide I-channel signal and Q-channel signal for the shift frequency $\Delta w_i$, so that a plurality of modulated signals each having specific carrier frequency are provided by adding all the I-channel signals and all the Q-channel signals.

Further, the number of input data is restricted to the number of the baseband signal process circuits.

The prior apparatus has further disadvantage that some of the baseband signal process circuits would not operate when the number of input data is less than the number of the baseband signal process circuits. It should be appreciated that the number of input data is adaptive based upon instantaneous amount of traffic. Thus, the prior apparatus has the disadvantage that the system does not follow the increase and/or the decrease of the traffic.

SUMMARY OF THE INVENTION

The object of the invention is to overcome the disadvantages and limitations of a prior group modulator by providing a new and improved group modulator.

It is also an object of the present invention to provide a group modulator which is simple in structure, having a single common baseband signal process circuit.

It is also an object of the present invention to provide a group modulator in which a number of carriers is adaptively controlled depending upon amount of traffic of input data.

The above and other objects are attained by a group modulator for providing a plurality of frequency division multiplexed modulated signals each having different carrier frequency from one another relating to a plurality of input digital data comprising; a multiplexer for effecting time division multiplex of input digital data; a mapping circuit for assigning amplitude and phase for each pattern of the multiplexed signal to provide I-channel signal and Q-channel signal according to the modulation system which modulates said input digital data; a pulse shaping circuit for restricting bandwidth of output of said mapping circuit; a frequency shift circuit receiving an external carrier control signal so that the frequency of the output of said pulse shaping circuit is shifted by the frequency defined by said carrier control signal; an accumulator for accumulating output of said frequency shift circuit during a predetermined period; a digital-to-analog converter for converting output of said accumulator from digital form to analog form; and a modulator for modulating output of said digital-to-analog converter to provide frequency division multiplexed modulated high frequency signal.

Preferably, said modulator is a quadrature modulator.

BRIEF DESCRIPTION OF THE DRAWINGS

The foregoing and other objects, features, and attendant advantages of the present invention will be appreciated as the same become better understood by means of the following description and accompanying drawings wherein;

FIGS. 5, 5(a) and 5(b) are a block diagram of a group modulator according to the present invention, FIG. 6 shows operational time chart of FIG. 5, FIGS. 8(a) and 8(b) show two embodiments of a block diagram of a frequency shift circuit in FIG. 5.

DESCRIPTION OF THE PREFERRED EMBODIMENTS

Figure 1:
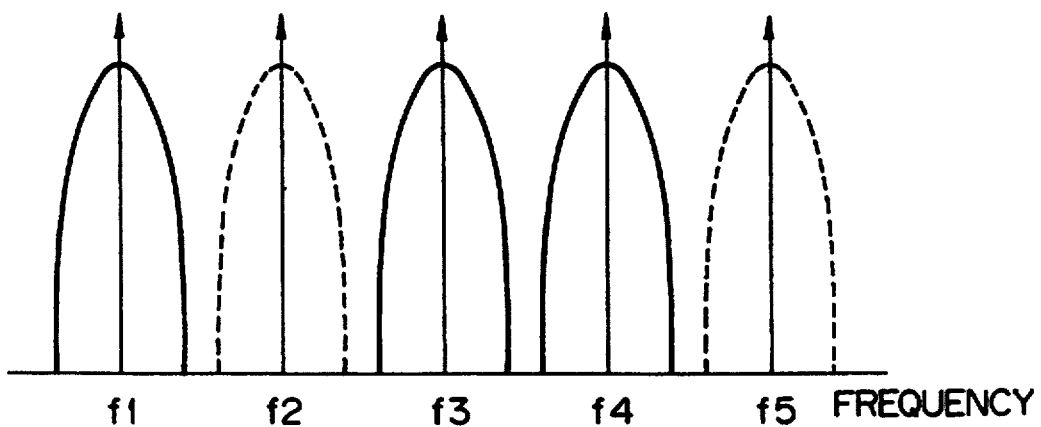
FIG. 1 shows frequency spectrum in high frequency band of frequency division multiplexed signal.

FIG. 5 shows a block diagram of a group modulator according to the present invention. In the figure, the numeral 1 shows a baseband signal process circuit which operates commonly for all the input data #1, through #n, where n is number of input channels. The baseband signal process circuit 1 has a time division multiplexer 11 which effects time division multiplex of all the input data sampling a value in a bit of each input data, and arranging the sampled values of all the input data in each bit period. The output of the multiplexer 11 is time divisional multiplexed signal. It should be appreciated that the presence of only one baseband signal process circuit 1 which operates on time divisional basis is the feature of the present invention.

The numeral 12 is a mapping circuit which effects the mapping of the signals of the output of the multiplexer 11 according to the quadrature modulation system. The output of the mapping circuit 12 is the I-channel signal and the Q-channel signal for the quadrature modulation.

It should be appreciated that serial-parallel conversion is carried out either in the multiplexer 11 or the mapping circuit 12 when input data is in serial form, so that parallel data is subject to mapping.

The numeral 13 is a pulse shaping circuit for restricting bandwidth for effecting bandwidth restriction for I-channel signal and Q-channel signal of an output of the mapping circuit 12.

The numeral 14 is a frequency shift circuit which receives an offset frequency indication or a carrier control signal (i; i=1−n) for each input data, and the frequencies of the I-channel signal and Q-channel signal of the output of the pulse shaping circuit 13 are shifted by the frequency defined by the carrier control signal (i). As the circuit operates in digital form, the frequency shift circuit 14 is essentially implemented by a multiplier for providing product of shift frequency and I-channel signal (or Q-channel signal), or a ROM (read only memory) which stores the product of shift frequency and I-channel signal (or Q-channel signal). The output of the frequency shift circuit 14 is the output of the baseband signal process circuit.

The numeral 21 is an accumulator for accumulating I-channel signal which is multiplexed, of the output of the baseband signal process circuit 1 for each bit period, so that all the component signals are added. The output of the accumulator 21 is essentially frequency division multiplexed I-channel signal. Similarly, the numeral 22 is an accumulator operating similar to that of the accumulator 21, but for Q-channel signal.

The outputs of the accumulators 21 and 22 are applied to the quadrature modulator 5 through the D/A converters 31 and 32, and the low pass filters 41 and 42. The former operate to convert signal format from digital form into analog form, and the latter operate to restrict frequency band. The members 21, 31 and 41 operate for I-channel signal, and the members 22, 32 and 42 operate for Q-channel signal.

Figure 3:
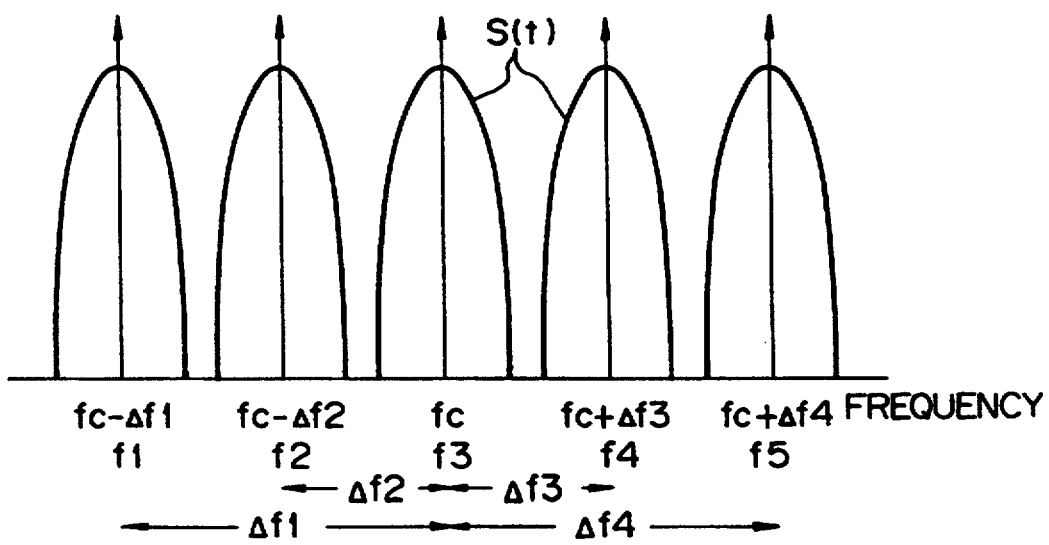
FIG. 3 shows frequency spectrum in high frequency band showing another method for providing frequency division multiplexed signal.
Figure 2:
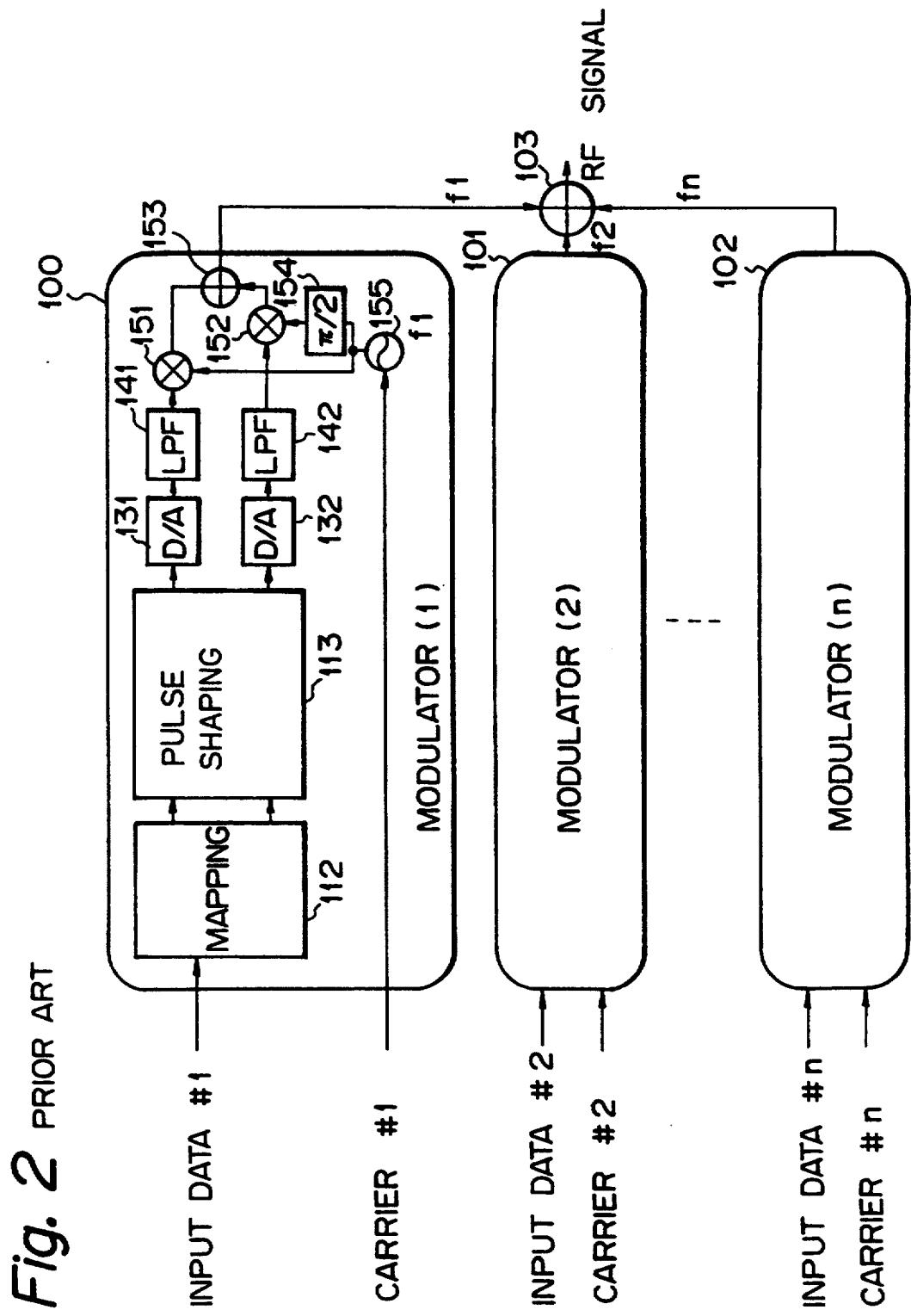
FIG. 2 is a block diagram of a prior group modulator.
Figure 4:
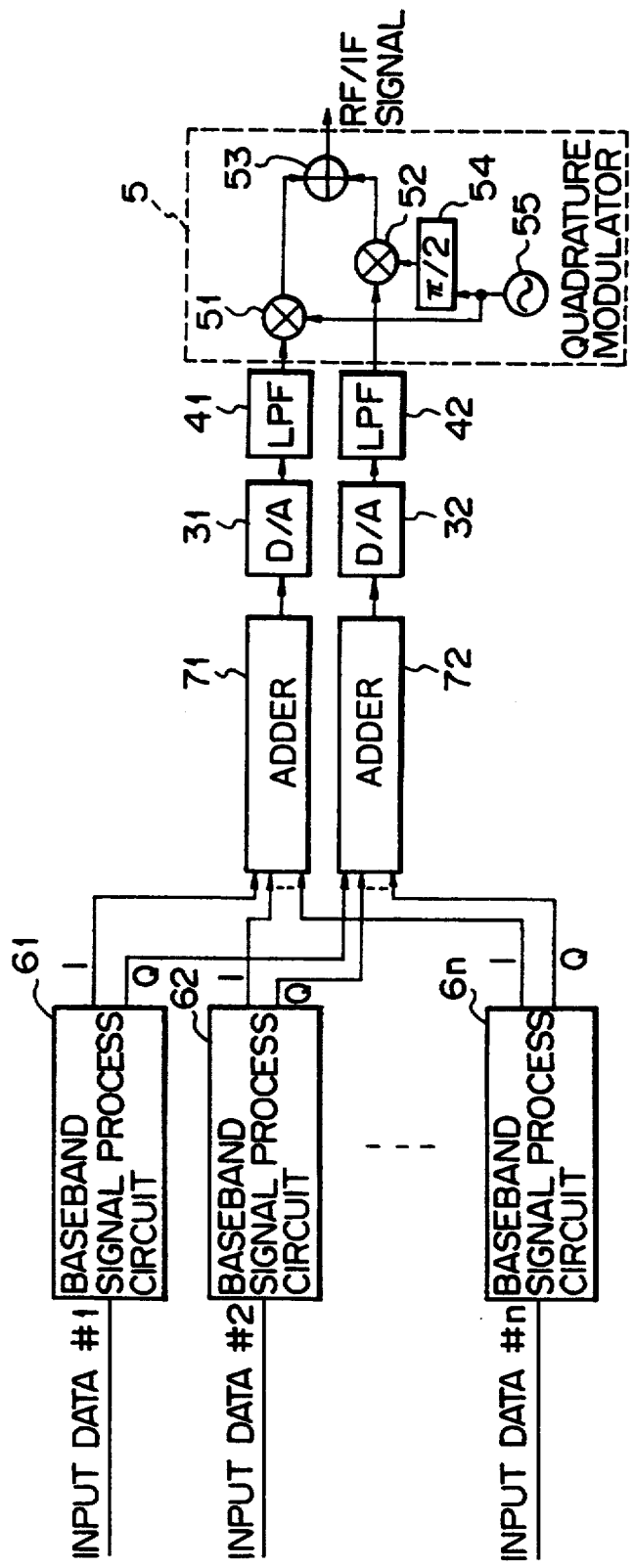
FIG. 4 is a block diagram of another prior group modulator.

The quadrature modulator 5 has a pair of mixers or frequency converters 51 and 52, an adder 53 for adding outputs of the mixers 51 and 52, an oscillator 55 which provides radio frequency $w_c$, and a phase shifter 54 which effects the phase shift by $1/2$ of the output of the oscillator 55 so that the mixers 51 and 52 receive the phase shifted radio frequencies by $1/2$. The structure the operation of the quadrature modulator itself are conventional. The output of the adder 53 is radio frequency signal modulated with multiplexed signal, having the frequency spectrum as shown in FIG. 3.

The numeral 6 is a multiplicity control which provides a process clock signal C and a frame signal F to the baseband signal process circuit 1 and the accumulators 21 and 22, according to the designated number of multiplicity which is provided by an external circuit (not shown), so that the number of the multiplicity follows the amount of the traffic of input data. The multiplicity is large when the traffic is large, and the multiplicity is small when the traffic is small.

FIG. 8 shows two embodiments of a frequency shift circuit 14. FIG. 8A shows the embodiment that the frequency shift circuit 14 is implemented essentially by digital multipliers, and FIG. 8B shows the case that the frequency shift circuit 14 is essentially implemented by ROM's.

In FIG. 8A, the numerals 101, 102, 103 and 104 are a multiplier, 105 is a ROM, 106 and 107 are an adder. The ROM 105, which receives the carrier control signal (i), provides the instantaneous values of cos $\Delta w_i t$, sin $\Delta w_i t$, and -sin $\Delta w_i$. The I-channel signal cos $\Theta_i(t)$ of the output of the pulse shaping circuit 13 is applied to multipliers 101 and 102, which also receive cos $\Delta w_i t$ and sin $\Delta w_i t$ of the output of the ROM 105, respectively, and provide the product cos $\Theta_i(t) \times \cos\Delta w_i t$, and cos $\Theta_i(t) \times \sin\Delta w_i t$ respectively. Similarly, the multipliers 103 and 104 which receive the Q-channel signal sin $\Theta_i(t)$ of the output of the pulse shaping circuit 13 provide sin $\Theta_i(t) \times \sin\Delta w_i t$ and -sin $\Theta_i(t) \times \cos\Delta w_i t$, respectively. The adder 106 provides the sum of the outputs of the multipliers 101 and 103, and said sum is cos $(\Theta_i(t)+\Delta w_i t)$. Similarly, the adder 107 provides the sum of the outputs of the multipliers 102 and 104, and said sum is sin $(\Theta_i(t)+\Delta w_i t)$. Thus, it should be appreciated that the outputs of the adders 106 and 107 provide the frequency shift of the I-channel signal and the Q-channel signal by the offset frequency $\Delta w_i$, which is defined by the carrier control signal (i).

FIG. 8B shows the other embodiment for implementing the frequency shift circuit 14. In FIG. 8B, the numerals 121, 122, 123 and 124 are a ROM, each storing the value of cos $\Theta_i(t) \times \cos\Delta w_i t$, cos $\Theta_i(t) \times \sin\Delta w_i t$, sin $\Theta_i(t) \times \cos\Delta w_i t$, and -sin $\Theta_i(t) \times \sin\Delta w_i t$. The numeral 125 is a step generator, which indicates the step for reading the address of each ROM based upon the carrier control signal (i). When the shift frequency designated by the carrier control signal is high, the step for reading the ROM is large, and when the shift frequency is low, the step for reading the ROM is small. For instance, when the step is 2, the ROM is read out in every other addresses, and the frequency read out of the ROM is twice of the frequency stored in the ROM.

The ROM 121, 122, 123 or 124 is read out by the address indication cos $\Theta_i(t)$ or sin $\Theta_i(t)$, and the step supplied by the step generator, and provides the output similar to that of the multipliers 101 through 104, respectively, in FIG. 8A. Then, the adders 126 and 127 operate similar to the adders 106 and 107 in FIG. 8A, and therefore, the frequency shifted I-channel signal and the frequency shifted Q-channel signal are obtained.

Now, the operation of the apparatus of FIG. 5 is described in accordance with FIG. 6.

The multiplicity control 6 receives the designation of the multiplicity n (n=2, 3, 4, et al), and provides the frame clock signal F and the process clock signal C, which are obtained by dividing a system clock signal according to the multiplicity n. The frame clock signal F has a pulse at the beginning of a bit period T, and the period of the frame clock signal F is equal to that bit period T. The process clock signal C has n number of pulses in every bit period T, where n is the number of multiplicity. Preferably, the process clock signal C and the frame clock signal F are synchronized with each other as shown in FIG. 6B, and still preferably, the first pulse of the process clock signal C in each bit period T coincides with the frame clock pulse F. In the embodiment, the multiplicity n is 5 in left portion of the figure, and n is 2 in the right portion of the figure.

In FIG. 6, (a) shows five series of input data #1 through #5, each applied to the multiplixer 11 in the baseband signal process circuit 1. Each of the input data #1 through #n has a series of digital bits $D_{n-1}^1$, $D_n^1$, $D_{n+1}^1$, $D_{n+2}^1$, et al. The period of the digital bits is T.

The multiplexer 11 carries out the time division multiplex so that the digital bits of n number of input data at each bit period are packed in a bit period T as shown in FIG. 6C, by using the frame clock signal F and the process clock signal C as shown in FIG. 6B. In left portion of FIG. 6, the multiplicity is 5 and five input data #1 through #5 are packed. And, supposing that the designation of the multiplicity changed from 5 to 2, two input data #1 and #2 are packed as shown in right portion of FIG. 6C.

The mapping circuit 12 carries out the serial-parallel conversion of the multiplexed signal of the output of the multiplexer 11, and effects the mapping of the signal according to the pattern of the multiplexed input signal and the modulation system of the quadrature modulator. The output of the mapping circuit 12 has an I-channel signal and a Q-channel signal, each having the mapped amplitude and the phase.

The pulse shaping circuit 13 effects the bandwidth restriction for those I-channel signal and Q-channel signal according to the transmission system. The outputs of the pulse shaping circuit 13 correspond to cos $\Theta_i(t)$ and sin $\Theta_i(t)$ in the equation (2).

The frequency shift circuit 14 receives a carrier control signal (i) where i=1 through n. The example of the carrier frequencies for each input data are 300 kHz, 600 kHz, 900 kHz et al. Therefore, it should be appreciated that i=1 (carrier control signal is 1) designates the carrier frequency of 300 kHz, and i=2 designates 600 kHz, i=3 designates 900 kHz, et al.

In FIG. 6C, the first data signal #1 ($Dn_{n-1}{}^1$) is frequency-shifted by 300 kHz as designated by the carrier control signal (i=1) in the first 1/5 duration of the bit period T. Secondly, the second data signal #2 ($D_{n-1}{}^2$) is frequency-shifted by 600 kHz as designated by the carrier control signal (i=2) in the second 1/5 duration of the bit period T. Similarly, all the input data are frequency-shifted according to the carrier control signals. The outputs of the frequency shift circuit 14 correspond to cos ($\Theta_i(t)+\Delta w_i t$) and sin ($\Theta_i(t)+\Delta w_i t$) in the equation (2). As all the signals are in digital form, the frequency shift circuit 14 is essentially implemented by a digital multiplier or a ROM (read only memory) as described in accordance with FIG. 8.

The amplitude information and the phase information of the I-channel signal and the Q-channel signal thus frequency shifted are output from the baseband signal process circuit 1.

It should be appreciated that since the baseband signal process circuit 1 operates in digital form, the period or the frequency spacing between the adjacent carrier frequencies is accurate and stable, and the switching of the carrier frequencies is quick and in high precise.

The accumulators 21 and 22 operate to accumulate each of the I-channel signal and the Q-channel signal of the output of the baseband signal process circuit 1 for all the input data during the period T. The output of the accumulators 21 and 22 is essentially the frequency multiplexed signal.

The output of the accumulators 21 and 22 are applied to the digital-to-analog converters 31 and 32, respectively. As a digital-to-analog converter has a latch at the input of the same, the accumulated input signal is latched in the latch, and then, the latched signal is converted to analog form. The latched signal is shown in FIG. 6D.

The outputs of the D/A converters 31 and 32 are applied to the quadrature modulator 5 through the low pass filters 41 and 42, which remove high frequency component in the outputs of the D/A converters. The outputs of the low pass filters 41 and 42 correspond to $\Sigma A(t) \cos (\Theta_i(t)+\Delta w_i t)$, and $\Sigma A(t) \sin (\Theta_i(t)+\Delta w_i t)$ in equation (3).

The quadrature modulator 5 provides the quadrature modulated RF (radio frequency) signal or IF (intermediate frequency) signal.

Figure 7:
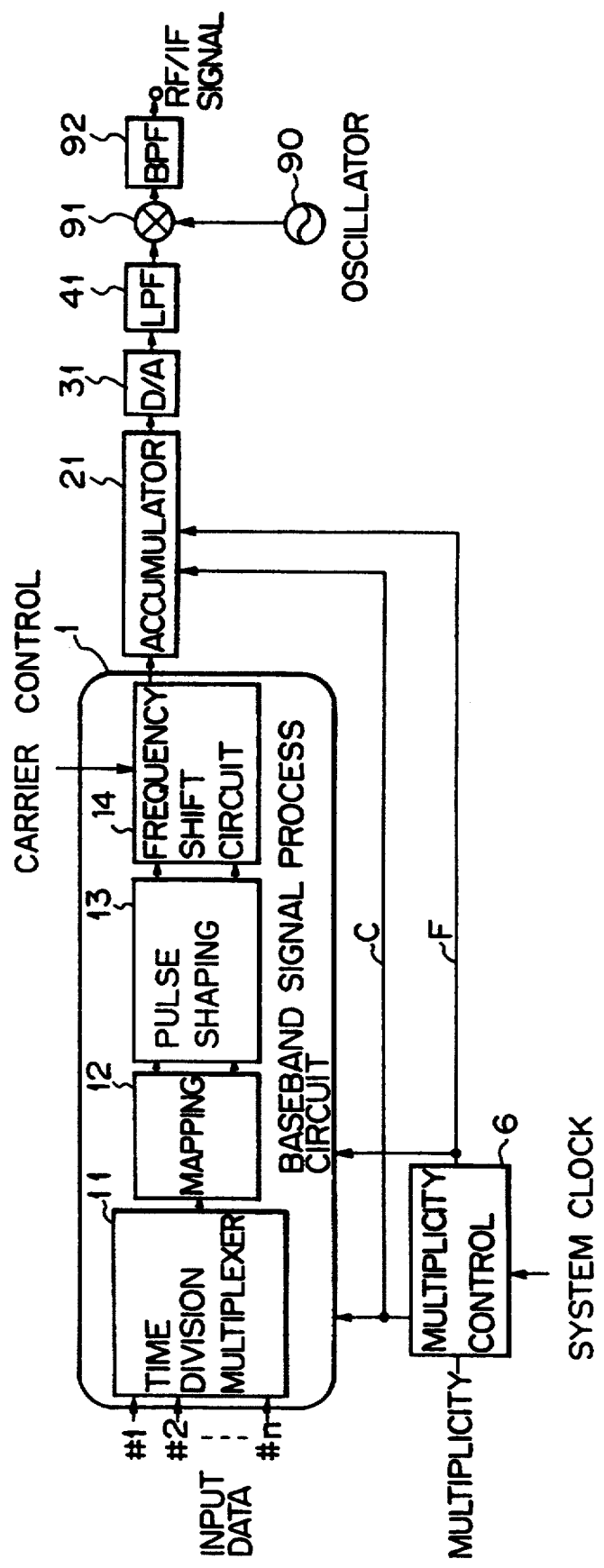
FIG. 7 is a block diagram of another embodiment of the group modulator according to the present invention.

FIG. 7 shows a block diagram of another embodiment of the present invention. The feature of FIG. 7 as compared with that of FIG. 5 is that the RF (or IF) signal is obtained through frequency conversion of one of I-channel signal and Q-channel signal which is frequency shifted and accumulated, instead of quadrature modulation. In FIG. 7, the numeral 90 is a mixer for frequency conversion, and 91 is an oscillator for providing local frequency $w_c$ to the mixer 90. The baseband process circuit 1 and the multiplicity control 6 in FIG. 7 are the same as those in FIG. 5, except that only one of I-channel signal and Q-channel signal is used. Only one set of an accumulator 21, a D/A converter 31 and a low pass filter 41 are used in FIG. 7, although a pair of those members are used in FIG. 5. Since a frequency converter provides a pair of side bands on both sides of the carrier frequency, a bandpass filter 92 for taking one of them and removing the other of them is provided at the output of the frequency converter. The output of the bandpass filter 92 is radio frequency signal which is frequency division multiplexed having a plurality of carriers.

The switching of the multiplicity is also possible in the embodiment of FIG. 7 by switching the number of process clock pulses F in each bit period T.

As described above in detail, according to the present invention, a plurality of input data are first time division multiplexed, then, the I-channel signal and the Q-channel signal for quadrature modulation are obtained through the mapping operation of the time division multiplexed signal. Then, the I-channel signal and the Q-channel signal thus obtained are frequency-shifted according to each carrier frequency designated by the carrier control. Then, the frequency shifted I-channel signal and the frequency shifted Q-channel signal are accumulated for the whole bit period T so that the essentially frequency multiplexed signal is obtained. Then, the quadrature modulation or frequency conversion is effected for the accumulated signal.

Therefore, it should be appreciated that the increase and/or the decrease of the number of input data or the multiplicity n is carried out simply by changing the designation of the multiplicity to the multiplicity control 6. No additional modulator and no additional baseband signal process circuit is necessary when a number of input data increases.

It should be appreciated that when the multiplicity n is small because of low traffic, the circuits in the apparatus operate with low rate, and therefore, the power consumption in the circuits is low.

As the spectrum of FIG. 3 of the present invention is the same as that of a prior art of FIG. 1, no modification of a receiver is necessary when the present invention is used in a transmitter.

When the present invention is used in a transmitter in a base station in a cellular telephone system and/or a mobile communication system, the communication system is adaptive to the change of the traffic with no change of hardware.

From the foregoing it will now be apparent that a new and improved group modulator has been found. It should be appreciated of course that the embodiments disclosed are merely illustrative and are not intended to limit the scope of the invention. Reference should be made to the appended claims therefore rather than the specification as indicating the scope of the invention.

What is claimed is:

1. A group modulator for providing a plurality of frequency division multiplexed modulated signals having different carrier frequency from one another relating to a plurality of input digital data comprising:
   a time division multiplexer for effecting time division multiplex of input digital data;
   a mapping circuit for assigning amplitude and phase for each pattern of the time dimension multiplexed input digital signal to provide I-channel signal and Q-channel signal according to a modulation system which modulates said input digital data;

a pulse shaping circuit for restricting bandwidth of output of said mapping circuit;

a frequency shift circuit receiving an external carrier control signal so that the frequency of said output of said pulse shaping circuit is shifted by the frequency defined by said carrier control signal;

an accumulator for accumulating output of said frequency shift circuit during a predetermined period;

a digital-to-analog converter for converting output of said accumulator from digital form to analog form; and a modulator for modulating output of said digital-to-analog converter to provide frequency division multiplexed modulated high frequency signal.

2. A group modulator according to claim 1, wherein said modulator is a quadrature modulator, and said mapping circuit provides the I-channel signal and Q-channel signal having phase difference by 90° for quadrature modulation.

3. A group modulator according to claim 1, wherein said digital-to-analog converter has a latch circuit to keep an input signal to the level at the initial stage of the conversion.

4. A group modulator according to claim 1, wherein a low pass filter is provided between output of said digital-to-analog converter and said modulator.

5. A group modulator according to claim 1, wherein a multiplicity control is provided so that a number of multiplicity in said time division multiplexer is adjustably controlled according to a multiplicity signal which is applied to said multiplicity control from an outside circuit.

6. A group modulator according to claim 1, wherein said modulator is a frequency converter, and a bandpass filter is provided at output of said frequency converter to remove undesirable side band generated in said frequency converter.

7. A group modulator according to claim 5, wherein multiplicity is adjusted according to amount of traffic of input data.

8. A group modulator according to claim 1, wherein said frequency shift circuit is implemented by a plurality of digital multipliers each providing product of input signal of said frequency shift circuit and instantaneous value of said shift frequency, and an adder for providing sum of outputs of two of said digital multipliers.

9. A group modulator according to claim 1, wherein said frequency shift circuit is implemented by a plurality of ROM's which store product of input signal of said frequency shift circuit and instantaneous value of said shift frequency, and an adder for providing sum of outputs of two of said ROM's.

* * * * *